US007533058B2

(12) United States Patent
Kulakowski (10) Patent No.: US 7,533,058 B2
(45) Date of Patent: May 12, 2009

(54) METHOD OF ACCOUNTING AND EFFECTING ELECTRONIC TRANSACTIONS

(75) Inventor: Henryk Kulakowski, Stalowa Wola (PL)

(73) Assignee: mPay International Sp. z o.o., Warszawa (PL)

( * ) Notice: Subject to any disclaimer, the term of this patent is extended or adjusted under 35 U.S.C. 154(b) by 968 days.

(21) Appl. No.: 10/721,329

(22) Filed: Nov. 26, 2003

(65) Prior Publication Data

US 2004/0143545 A1    Jul. 22, 2004

(30) Foreign Application Priority Data

Nov. 27, 2002  (PL) ..................... 357402
Nov. 27, 2002  (PL) ..................... 357403
Nov. 6, 2003   (PL) ..................... 363338

(51) Int. Cl.
    *G06Q 40/00*    (2006.01)
(52) U.S. Cl. ............................ 705/40; 902/8
(58) Field of Classification Search ............ 705/35, 705/38–44; 902/8–24, 30–35, 37–41; 725/1–6
    See application file for complete search history.

(56) References Cited

U.S. PATENT DOCUMENTS

| 5,749,075 | A |   | 5/1998  | Toader et al. |        |
|-----------|---|---|---------|---------------|--------|
| 5,878,141 | A | * | 3/1999  | Daly et al.   | 705/78 |
| 5,999,919 | A |   | 12/1999 | Jarecki et al. |       |
| 6,282,522 | B1|   | 8/2001  | Davis et al.  |        |
| 2002/0062249 | A1 | | 5/2002 | Iannacci      |        |
| 2002/0062285 | A1 | * | 5/2002 | Amann et al.  | 705/43 |
| 2002/0103753 | A1 | * | 8/2002 | Schimmel     | 705/39 |
| 2002/0111886 | A1 | * | 8/2002 | Chenevich et al. | 705/30 |
| 2002/0123965 | A1 | | 9/2002 | Phillips      |        |
| 2002/0128968 | A1 | * | 9/2002 | Kitchen et al. | 705/40 |

(Continued)

FOREIGN PATENT DOCUMENTS

DE    19903363    8/2000

(Continued)

OTHER PUBLICATIONS

Humphrey, "The Economics of Electronic Benefit Transfer Payments", Spring, 1996, Economic Quarterly, v82, n2, p. 77 (18).*

(Continued)

*Primary Examiner*—Mary Cheung
(74) *Attorney, Agent, or Firm*—Hunton & Williams LLP (57) ABSTRACT

A method of accounting electronic transactions is disclosed. The transaction may be initiated by the payer (1) from an electronic terminal or telephone, to cause the following to be delivered to the accounting system (3): the transaction code (A), the amount (B), payer's ID (D), and the payee's ID (C). The accounting system (3) verifies whether the payer (1) is an authorized user, whether a beneficiary with the given payee's ID (C) exists and what types of transactions are handled by this beneficiary, as well as whether the specified amount (B) is available on the payer's (1) payment account (4). The accounting system (3) sends cumulative information on the transaction (E) to the payer (1). The payer (1) is requested to accept the transaction, or to correct or complete data. The accounting system (3) effects accounting of the transaction (G) on the payment account (4) and sends acknowledgment of the payment (H) to the payee (2).

7 Claims, 2 Drawing Sheets

U.S. PATENT DOCUMENTS

| | | | |
|---|---|---|---|
| 2002/0147685 A1* | 10/2002 | Kwan | 705/44 |
| 2002/0174016 A1 | 11/2002 | Cuervo | |
| 2003/0216996 A1* | 11/2003 | Cummings et al. | 705/39 |
| 2004/0044621 A1* | 3/2004 | Huang et al. | 705/40 |

FOREIGN PATENT DOCUMENTS

| | | |
|---|---|---|
| DE | 10028028 A1 | 12/2001 |
| EP | 1136961 A1 | 9/2001 |
| FR | 2820232 | 8/2002 |
| WO | WO 98/30985 | 7/1998 |
| WO | WO 01/09851 | 2/2001 |

OTHER PUBLICATIONS

Demme, et al., "Zahlungsweisen im Internet," Jan. 17, 1999, pp. 1-11.

International Search Report mailed Jun. 14, 2004 in International Application No. PCT/PL03/00129.

* cited by examiner

Fig. 4

METHOD OF ACCOUNTING AND EFFECTING ELECTRONIC TRANSACTIONS

CROSS REFERENCE TO RELATED APPLICATIONS

This application claims priority to the following Polish applications: Application No. P-357402, filed Nov. 27, 2002, Application No. P-357403, filed Nov. 27, 2002 and Application No. P-363338, filed Nov. 6, 2003, which are all hereby incorporated by reference.

FIELD OF THE INVENTION

This invention applies to a method of effecting and accounting electronic transactions and means of payment, and in particular, effecting and accounting electronic-transactions through the use of phones.

BACKGROUND OF THE INVENTION

In the state of the art technology, a number of solutions for effecting electronic transactions are known. However, in most cases the way of accounting transactions depends on the chosen method or kind of transaction (e.g. payment card transactions, parking payment from a pre-paid account, etc.).

The most commonly applied solution is a payment card (magnetic or microprocessor). The most popular payment card systems are: Visa, MasterCard or American Express. A payment card is assigned to one specific payment account, thus the funds available on the card can derive only from one place. Owning a larger number of accounts at financial institutions compels a necessity to use other cards as well, which often is both uncomfortable for the user and not safe. The presented solution assumes a possibility to use a number of different payment accounts, identified through one identifier within a single payment system. This way, funds can be accessed from more than one payment account at the same time.

From the application WO0109851, methods of effecting payments with payment cards are known, where a mobile phone is used as a card authorization terminal, or the transaction is effected on the basis of information on the credit card provided by the user (DE10028028). From the description U.S. Pat. No. 6,282,522, the commonly applied solutions for payments with payment card via Internet are known. The methods used make it possible to only send information on the payment card to the respective authorization center, where the transaction accounting proceeds always in the same way and depends on the payment card's technology.

The prior art includes also electronic payment solutions with the use of pre-paid accounts or directly with bank accounts. The micropayment systems known from U.S. Pat. No. 5,999,919 can serve here as an example. However, their functionality and application areas are often limited, e.g. only to payments via Internet, or—as in the case of U.S. Pat. No. 5,749,075—to payments for telecommunication services, and transaction accounting as such is determined by the technology used.

From EP1136961, solutions are known which use phone for effecting electronic payments—especially wireless phone in a mobile telecommunication network. However, the solutions available do not provide a uniform method of effecting various types of payments and in most cases are complicated and not especially user-friendly. As in the case of FR2820232, these are often not very universal methods, allowing only for effecting a payment in a limited application area alone.

The aim of this invention is to create a universal and uniform system for accounting electronic transactions, which would possibly handle all kinds of transactions and various types of payment accounts, and which in particular would be adapted to the requirements and needs of today's market. Moreover, the invention aims to provide its user with full control of transactions effected as well as with comfortable and simple method of using, especially when effecting payments via phone.

SUMMARY OF THE INVENTION

A characteristic feature of the method of accounting electronic transactions, according to the invention, is the fact that transactions are initiated by the payer from an electronic terminal, the operation causing the following to be delivered to the accounting system: the transaction code, describing the kind of transaction selected, the amount describing the transaction value, payer's ID, which is explicitly assigned to the specific payer, and the payee's ID, which is assigned to the beneficiary of the payment; next, the accounting system verifies whether the payer is an authorized user, whether a beneficiary with the given payee's ID exists and what kind of transactions are handled by this beneficiary, as well as whether the given amount is available on the payer's account, after which the accounting system sends cumulative information on the transaction to the payer, which preferably contains also extended information on the transaction, while the payer is requested to accept the transaction, to correct or complete data, and upon having received acceptance for the transaction, the accounting system effects accounting of the transaction on the payment account, and sends acknowledgment of the transaction to the payee as well as acknowledgment of the payment to the payer, which contain preferably additional information delivered to the accounting system by the payee.

Preferably, a number of different payment sub-accounts are assigned to one payment account within its limits; those sub-accounts are connected directly to institutions managing funds of the respective payer, a single transaction of which, initiated by the payer, is preferably accounted jointly from several payment sub-accounts, while the payer, when initiating a transaction, preferably effects a pre-selection of a single sub-account or of a defined group of payment sub-accounts, from which the transaction is to be accounted, by choosing the corresponding transaction code or alternatively the payee's ID, assigned to the given type of transaction.

The same payment sub-account is used by a number of different payers within their payment accounts for accounting transactions initiated by them.

Preferably, the payee's ID is a static ID, alternatively a temporary ID or alternatively a local ID, whereas the static ID is permanently assigned to the payee within the accounting system, the temporary ID can be given on a temporary basis upon the payee's request, for a specified time period or for the needs of a single transaction, and the local ID is provided to the payee by the payer in order to account transactions for a payee who is not defined in the accounting system and the payee cannot be accessed by other payers. At the same time, the specific transaction is explicitly identified by the temporary ID which has been assigned especially to this transaction.

The payee's ID is assigned to a specific offer of the payee, through which the offer is explicitly identified.

With the method according to the invention, a transaction—as a periodical transaction—alternatively lasts for the given period of time, and the amount is calculated by the accounting system during the session of a transaction initiated by the payer, automatically for every accounting unit, delivered or defined by the payee, initiation of transaction by the payer causing the beginning of unit-charges being calculated, which constitute components of the transaction amount, whereas conclusion and complete accounting of the transaction is effected upon a request from the accounting system, the payee or the payer, and upon conclusion of the transaction acknowledgment of the payment is sent again to the payee, and the payer receives acknowledgment of the transaction, which include cumulative information concerning the whole transaction and its conclusion, while unit-charges are preferably accounted by the accounting system on-line or off-line.

Preferably, the amount is delivered to the accounting system in the beginning of a periodical transaction, while such a transaction is calculated up to the value of the given amount, after which it is terminated by the accounting system.

With the method according to the invention, the transaction amount is received from the payee upon a request from the accounting system, which makes it possible to verify whether the amount specified by the payer is correct on the basis of the transaction amount, or to preferably exclude the necessity to quote the amount when initiating a transaction by the payer, whereas concurrently with the transaction amount, the payee sends preferably additional information on the transaction to the accounting system.

Preferably, acknowledgment of the payment sent to the payee includes additional information on the payer, which are not directly related to transaction accounting.

A characteristic feature of the method of effecting electronic transactions via phone is the fact that transactions are initiated by establishing a connection from the payer's phone to the servers of the accounting system, where the transaction parameters are specified directly in the sequence dialed on the phone in the course of the connection being initiated and are sent via a telecommunication network to servers with the payer's ID from the phone, whereas any missing parameters of the transaction are preferably completed by the payer during the connection session, and acknowledgment of the transaction to the phone is sent by the accounting system alternatively after the connection has been finished.

Preferably, in the case when the given transaction is effected in the same telecommunication channel in which a connection between the payee and the payer has already been established, the payer does not need to establish a new connection to the accounting system in order to have the transaction accounted, but the ongoing connection is preferably redirected to the accounting system by the payee, while the payee delivers to the accounting system at the same all the transaction parameters which are known to him.

Preferably, a connection is established in a voice channel with tone dialing DTMF or alternatively through a text message in a signaling channel with the use of USSD in such a way that the user initiates the connection directly from the keyboard of the phone, dialing a sequence containing parameters of the transaction, where each of the transaction parameters is preceded by a star symbol "*", and in the case of a USSD sequence, it ends with a hash symbol "#", preferably causing that placement of the hash symbol "#" at the end of the sequence determines whether this would be a voice transaction or a text transaction.

BRIEF DESCRIPTION OF THE DRAWINGS

Embodiments of the invention are shown in the drawing, where.

DETAILED DESCRIPTION OF THE PREFERRED EMBODIMENTS

Figure 1:
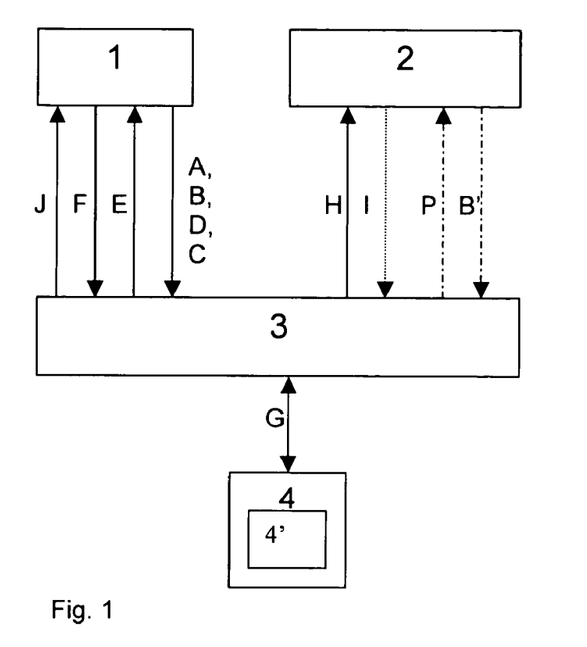
FIG. 1 shows the general method of accounting electronic transactions.

According to the invention presented in FIG. 1, payer 1, owning an account in the accounting system 3, initiates a payment from an electronic terminal operated by this system. In order to account the given transaction in a correct way, the accounting system 3 has to receive all the indispensable information, including the following: the transaction code A, the payee's ID C, the payer's ID D and preferably the amount B.

The transaction code A allows for distinction of the type of transaction effected, for example: payment transaction, cancellation of a transaction, cash withdrawal, or alternatively for selection of a group or a single sub-account 4' of the payment account 4, with which the transaction shall be accounted, for example: payment transaction from a business sub-account, cash withdrawal from a group of private sub-accounts.

The amount B explicitly specifies the value of the transaction accounted. Preferably, the amount B given by the payer 1 is confronted with the transaction amount B' given by the payee 2 upon a request P from the accounting system 3. Preferably, if the transaction amount B' is at the disposal of accounting system 3, there is no need to deliver the amount B, and the transaction is accounted on the basis of the transaction amount B' given by the payee 2.

The payee's ID C serves to identify the payee 2. Preferably, one payee 2 owns a number of different payee's IDs C at the same time. The payee's ID C plays the role of identification of a specific payment place (e.g. a cash register), alternatively a specific article/service (e.g. in the case of TV shopping in a TV commercial), or alternatively a specific transaction (e.g. via Internet). Preferably, the payee's ID C identifies also the acceptable type of transaction with the given payee 2, due to which only particular types of transactions can be effected for the specific payee's ID C.

The unique payer's ID D explicitly identifies the payer 1 in the whole accounting system 3. Within the accounting system 3 alternatively coexist several different types of payer's IDs D, while the individual payer's IDs D do not duplicate and do not overlap, and one payer 1 is alternatively identified by several IDs of that kind, e.g. by customer number, telephone number.

In the accounting system 3, one payer 1 has only one payment account 4 assigned, containing at least one or preferably a number of payment sub-accounts 4', whereas the same payment sub-account 4' is assigned freely even to several different payment sub-accounts 4. The payment sub-account 4' is integrated with the actual payment account, e.g. a bank account, on which the payer 1 holds his funds.

Having received the data needed for the transaction to be effected, the accounting system 3 verifies whether the payer 1, who initiated the transaction, is authorized to do it and whether the payer 1 possesses a suitable payment account 4, from which the transaction can be accounted. If the payee 2 is permanently connected with the accounting system 3, then the preferably is sent to the payee 2 a request for the transaction amount B', which is compared to the amount B or preferably the amount B is not required, as it is collected by the accounting system 3 as the transaction amount B' only from the payee 2.

After verification of the possibility to effect the transaction and to access the amount B on the payment account 4, the accounting system 3 sends to the payer 1 cumulative information on the transaction E with a request to accept the transaction.

This information preferably contains additional data on the transaction as well as on the payee 2, which allow for a full and comprehensible description of the transaction. In order to confirm correctness of the transaction, the payer 1 sends back the transaction acceptance F, which preferably contains a user password or a PIN code for acceptance of the transaction. After its receipt, the accounting system 3 effects the transaction accounting G on the payment account 4. Preferably, a single transaction is accounted within one payment account 4 from a number of payment sub-accounts 4' at the same time, depending on their configuration and respective availability of funds. In case of several payment sub-accounts 4' possessed, they are preferably grouped. The payment account for accounting a transaction is selected on the basis of an analysis of the transaction code A or alternatively the payee's ID C, effected by the accounting system 3.

After the transaction has been accounted on the payment account 4, the accounting system 3 sends the acknowledgment of the payment H to the payee 2 and acknowledgment of the transaction J to the payer 1. If the payee 2 is permanently connected with the accounting system 3, then he preferably sends back additional information I communicated to the payer 1 within the acknowledgment of the transaction J.

Figure 2:
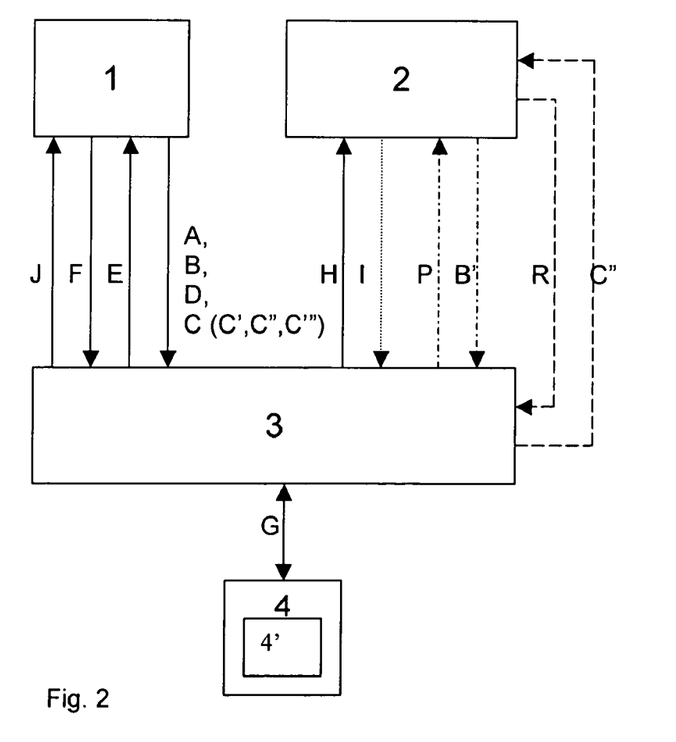
FIG. 2 shows the method of accounting electronic transactions with the use of a static, a temporary and a local ID.

FIG. 2 shows the payee's ID C, which enables the payer 1 to explicitly identify the payee 2 and to effect a transaction for his benefit. According to the standard procedure, the payee's ID C is assigned by the accounting system 3 as a so-called static ID C', i.e. a constant discriminant in the system, equally accessible for all payers 1. Alternatively, the accounting system 3 provides the payee 2 with a temporary ID C", which is assigned on a temporary basis, upon the payee's 2 request R, for the given time period or for the needs of a specific transaction. After the specified deadline, or after completion of the given transaction, the temporary ID C" is taken away from the payee 2 by the accounting system 3 and is available for any payee 2. The same temporary ID C" of a payee 2 identifies any payees 2 at different intervals of time, but only one payee can be identified with its use at the same time.

Alternatively, the payer 1 independently provides the payee 2 with a local ID C'", which allows the identification of the payee 2 to be effected only and exclusively by this payer 1.

When defining a new payee 2 for own needs, the payer 1 has to enter all necessary data which allow the transaction to be fully accounted by the accounting system 3. The same local ID C'" is at the same time interval preferably assigned to various payees 2, but each of them is available for use only for the specific payer 1 who provided the given definition.

Figure 3:
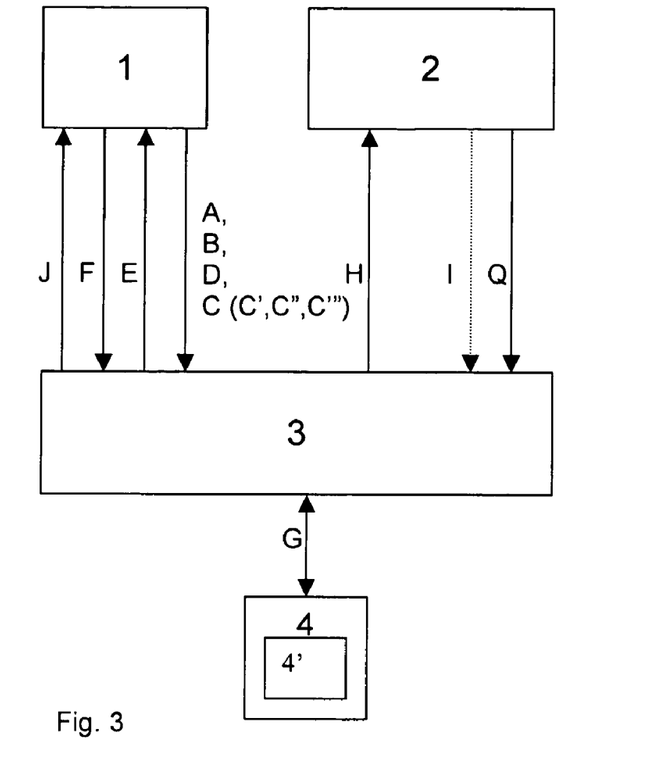
FIG. 3 shows the method of accounting periodical electronic transactions.

In the case when periodical fees are charged, which is shown in FIG. 3, initiating a transaction by the payer 1 results in the beginning of charges being calculated, which are preferably accounted on a current basis G, whereas the full transaction accounting is effected after its completion: upon a request from the payer 1—if the payer does not wish to use the service any longer, from the payee 2—when he has already ceased provision of the service or explicitly stated that the given user has ceased to use it, or from the accounting system 3—when a failure or error occurred, or when the funds on the payer's 1 account have been used up. The amount B is not delivered to the accounting system 3 at initiation of the transaction, but is calculated by the accounting system 3 during the transaction session, automatically for every accounting unit Q, delivered or defined by the payee 2.

Preferably during the session of a periodical transaction, transaction accounting G for every accounting unit Q is effected on a current basis by the accounting system 3 from the payment account 4, on which the availability of funds needed for the transaction to be continued is checked at the same time. Alternatively, during initiation of a periodical transaction, the amount B is delivered to the accounting system 3, which causes that such a transaction is calculated up to a value equal to the amount B and cannot exceed it. Upon an attempt to exceed the amount B by a transaction, the transaction is automatically terminated by the accounting system 3. Both according to the standard procedure after the beginning of the transaction, and also additionally after its completion, the payee 2 receives the payment acknowledgment H, and the payer 1—the transaction acknowledgment J.

Figure 4:
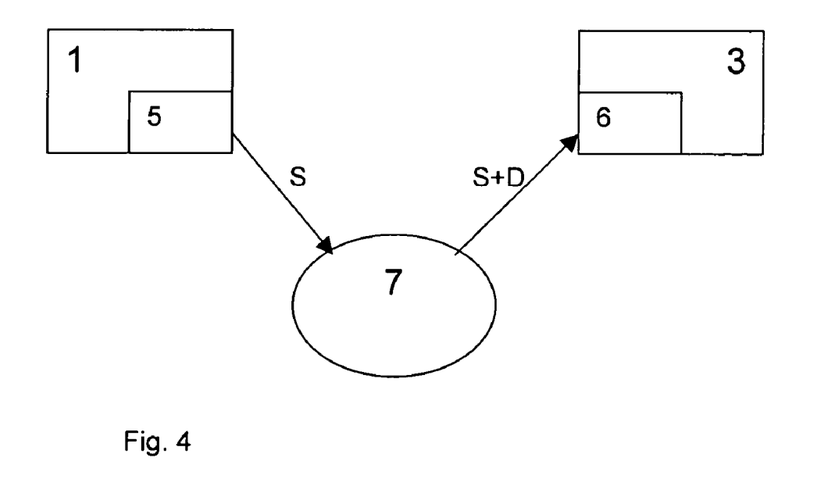
FIG. 4 shows the method of effecting electronic transaction via phone.

The method of effecting electronic transaction with use of a phone, presented in FIG. 4, is based on the fact that in order to effect a transaction, the payer 1 uses a phone 5, from which he initiates a telecommunication connection by dialing the sequence S on the keyboard of the phone 5. Initiation of a telecommunication connection means initiation of a transaction at the same time, because the dialing sequence S includes transaction parameters. Those parameters, together with the payer's ID D for the phone 5, via the telecommunication network 7 reach servers 6 of the accounting system 3, which will identify the transaction parties and effect accounting of the transaction, basing on the information received. In the case it should be necessary for the payer 1 to specify additional parameters of the transaction, to correct or to complete them, he will preferably perform these activities during the session of the telecommunication connection. Acknowledgment of the transaction is preferably sent to the phone 5 already after the connection has been finished, e.g. via SMS or fax, due to which the payer 1 receives non-transitory acknowledgment of the transaction.

Preferably, the telecommunication connection is established in a voice channel, as a voice transaction, or alternatively as a text transaction in a signaling channel with the use of USSD. Then, the sequence S, dialed on the phone 5 in the course of initiation of the connection, contains the necessary parameters of the transaction, where each parameter is preceded by a star symbol "*", and in the case of a USSD sequence, it ends additionally with a hash symbol "#". Both the sequences are identical, contain the same information, and the hash symbol "#" at the end of the sequence determines the choice of a voice transaction or a text transaction, whereas during the whole session of connection both transactions are similar—the only differing factor is the method of communicating and transferring information to the user. The functionality is identical in both cases. In the case when the transaction is effected in a voice channel, the transaction parameters are specified in the phone number dialed, or transmitted via tone dialing DTMF. In the case of a text transaction with the use of USSD, the transaction parameters are transmitted in the USSD sequence, or afterwards during data exchange in a USSD session.

In the examples given below, mobile phones as the phone 5 serve as payment terminals for effecting transactions, while the phone 5 can alternatively be replaced by another electronic device communicating with the accounting system 3. The transaction is effected by using the sequence S from the phone 5 in the form of USSD commands or tone dialing DTMF. The payer 1 is identified by means of the payer's ID D, which is the MSISDN number of his mobile phone. In all the examples, the payer 1 possesses a private payment account at a bank within the payment account 4. The accounting system 3 is equipped with appropriate servers 6, and connections from the phone 5 are effected via the telecommunication network 7.

EXAMPLE 1

The payer 1 is going to pay for an article purchased in a store. The payee 2 communicates his payee's ID C reading 123456 to the payer 1. The payee 2 uses a mobile phone for transaction authorization as well. The transaction code A in the case of payment for goods is 145. The amount B is PLN 100. The payers 1 dials from his phone 5 the sequence S USSD *145*123456*100# or *145*123456*100, if the transaction will be effected in a voice channel. These data, in connection with the MSISDN number of his mobile phone serving as the payer's ID D, are transferred from the data communication system of the telecommunication operator to the accounting system 3, which checks whether a payer 1 with this number can be found in the system, whether a payee 2 with the given payee's ID C 123456 exists and whether the selected type of transaction (here: a payment) can be effected between them. The accounting system 3 checks whether the payee 2 is permanently connected and provides a possibility to collect the transaction amount B'. If there is no such possibility, it is checked whether the amount B has been specified by the payer 1. Basing on the data received, the accounting system 3 checks, to which payment account 4 the payer 1 is assigned and whether the payer 1 holds adequate funds. After verification of all data concerning the transaction, the accounting system 3 sends to the payer 1 cumulative information on the transaction E with additional information on the payee C as well as on the transaction itself (name of the payee, description of the transaction). The payer 1 accepts the transaction F by entering his own PIN code. The accounting system 3 connects to the payment account 4 and effects accounting of the transaction G for the amount B, under consideration of potential commissions, after which the system sends to the payee 2 acknowledgment of the payment H in the form of a text message (SMS), containing among others the transaction ID and information on the amount B. Acknowledgment of the transaction J is received by the payer 1 as well, and, apart from the transaction ID, it includes information on the amount B and the payee 2.

EXAMPLE 2

Within the payment account 4, the payer 1 possesses two private accounts at two different banks and a business account, from which he effects payments for the company. The payer 1 holds PLN 50 on each of the private accounts respectively, and PLN 10 on the business account. The transaction code A for transactions effected from a private account is 145, and for the business account—146. The payer 1 is going to park his business car on a paid municipal parking place and account this transaction from the business account, as well as withdraw cash from the private account. On the parking meter, being the property of payee 2, his payee's ID C is displayed as 321321.

The payer 1 initiates a business transaction from his phone in the form of a sequence S USSD: *146*321321#. This information is sent together with the telephone number of the payer 1 to the accounting system 3, which verifies the data received. On the basis of data assigned to the payee's ID C, the accounting system 3 recognizes that the thus identified payee 2 effects only periodical transactions (parking), charged according to an outline defined by the payee: PLN 0.1 for every parking minute.

The accounting system 3 sends to the payer 1 cumulative information on the transaction E, concerning the beginning of calculation of charges. The payer 1 accepts the transaction F, after which collection of amounts for every parking minute in advance from his business account on the payment account 4 is started. The payee 2 and the payer 1 receive respectively acknowledgments of the payment H and acknowledgments of the transaction J. In the case when the accounting system 3 receives from the payment account 4 information stating insufficient funds, it terminates the transaction, sending an appropriate acknowledgment of the payment H to the payee 2 and acknowledgment of the transaction J to the payer 1, while it additionally includes information on the cause for termination of the transaction. In the meantime, the payer 1 wishes to withdraw in a nearby store PLN 70 in cash from his private account. The store possesses two payee's IDs C. The first one of them is assigned to effecting payments for goods, and the other one—with the number 121323—makes effecting cash withdrawals possible. The payer 1 dials the following sequence from his mobile phone: *145*121323#. The data entered, together with the telephone number of the payer 1, are sent to the accounting system 3, which verifies on the basis of payee's ID C that the given transaction can apply only to cash withdrawal, while the maximum acceptable amount of one withdrawal at this payee 2 is PLN 100. Since the amount B has not been specified, feedback information is sent to the payer 1 with a request to specify the withdrawal amount B, which upon its receipt is verified by the accounting system 3 against the funds available on the payment account 4. Now that the amount B exceeds the funds available within the first payment sub-account 4', the accounting system 3 checks the subsequent payment sub-accounts 4' and confirms that the total amount accumulated on both of them will suffice for the transaction to be effected.

Cumulative information on the transaction E is sent to the payer 1 with a request to accept it, after which the payer 1 sends back the PIN code as acknowledgment of the transaction F.

The accounting system 3 effects accounting of the transaction G subsequently from both payment sub-accounts 4'. The payee 2 receives acknowledgment of the payment H, containing among others information on the need to effect cash withdrawal for the benefit of the payer 1, who receives acknowledgment of the transaction J.

EXAMPLE 3

The payer 1 uses his mobile phone in a pre-paid system. He is going to purchase at his telephone operator, acting as payee 2, accounting units, which provide him with the possibility to use the services offered by this operator. The transaction code A is 145. The payee's ID C in case of the operator is 112233. The payer 1 has two variants for the purchase of units:
1. to declare with the sequence S USSD *145*112233*100# purchase of accounting units Q for a value equivalent of PLN 100, or
2. to order with the sequence S USSD *145*112233# current accounting of charges for the accounting units Q used at the telephone operator within the accounting system 3.

The payee 2 with the selected payee's ID C provides only a possibility to effect periodical settlements. After verification of all data and upon sending acknowledgments, calculation of charges is started. The payment is accounted on a current basis, according to accounting units Q delivered by the payee 2, or the transaction is terminated in case of insufficient funds available on the payment account 4. In the case of the first variant being chosen, the service is provided by the telephone operator up to the moment when the accounting system finds the limit of PLN 100 entered by the payer 1 as the amount B exceeded. With the second variant, the transaction is not limited in time. In both cases, the transaction can be terminated by the payer 1 upon sending the sequence S *145*112233#, ending the transaction, by the accounting system 3, if the system finds insufficient funds available on the payment account 4 or by the payee 2, if the payee 2 should for any reason cease provision of the service for the benefit of the payer 1.

EXAMPLE 4

The payer 1 is going to purchase articles in an Internet store. Having chosen articles for the total amount of PLN 100, he selects on the web page the method of payment via his mobile phone. The transaction code A is 145. The payee 2, i.e. the Internet store, sends to the accounting system 3 a request R for assignment of a temporary ID C" and receives it as 123123, after which the payee displays on the web page a list of products purchased by the payer 1 with a request for him to dial on his mobile phone the sequence S: *145*123123#. After the given sequence has been dialed, the data delivered to the accounting system 3 are verified, and upon a request P the transaction amount B' is collected from the payee 2. In the course of the request P from the accounting system 3, concerning the transaction amount B', it is certain that the payer 1 has already placed a transaction order, thus the web page of the store is being automatically refreshed with the information that the transaction is in process, and upon receiving acknowledgment of the payment H, the web page has the status of a transaction effected displayed. When effecting the transaction, the payer 1 does not need to fill in any boxes on the web page or to click on any elements. After completion of the transaction, the dynamic ID C" assigned to the payee 2 is released and can be at any time assigned by the accounting system 3 to any other payee 2 who sends an appropriate request P.

EXAMPLE 5

The payer 1 would like to buy a beverage in a classic coin machine connected to a telecommunication network. The payee 2, acting as the owner of the machine, placed on it a static ID C' saying 323232. The transaction code A is 145. The payer 1 dials on his mobile phone a sequence S USSD of: *145*323232#. The data, together with the MSISDN number as the payer's ID D, are sent to the accounting system 3, which—noticing that the payer 1 has not specified the amount B—requests the payee 2 to specify the transaction amount B', related to the given machine. The payee 2 has the possibility to freely specify the amount for the given machine, which makes it possible for him to take advantage of various special price offers. Having received the transaction amount B', the accounting system 3 sends to the payer 1 a cumulative specification of the transaction E, after which the system receives from the payer 1 acknowledgment of the transaction F. After accounting of the transaction G on the payment account 4, the payee 2 receives acknowledgment of the payment H, which allows the machine to release the beverage chosen by the payer 1.

EXAMPLE 6

The payer 1 takes advantage of a web banking offer provided by the bank operating the payment account 4 and co-operating with the accounting system 3. Within this service, the payer 1 has model transfers defined for selected payees 2 who are not identified by the accounting system 3 within the standard procedure. The payer 1 introduces to the accounting system 3 selected payees 2 for his own needs, providing them with local IDs C'" within the range assigned by the accounting system 3.

After each transaction initiation effected by the payer 1, the accounting system 3 collects from the bank operating the payment account 4 a full set of data (model transfer), identified by the local ID C'" used for this transaction. On the basis of data collected, the accounting system 3 issues a classic transfer order, taking into account the amount B specified by the payer 1. If the amount B has not been specified, the value defined in the model transfer is assumed.

EXAMPLE 7

The payer 1, using his mobile phone, is going to transfer his money to another mobile phone user with the phone number MSISDN 601234567, within the network of the operator the accounting system 3 has signed an agreement with. The recipient of the payment is at this point seen as an external payee 2, whereas his payee's ID C does not originate from the standard 6-digit-numbering range, but is perceived as a unique 9-digit phone number (MSISDN). The transaction code A is 145. The payer 1 dials on his phone a transaction sequence S in the form of USSD codes *145*601234567*100# or in the case of a voice connection, the sequence *145*601234567*100, which orders transferring the amount B of PLN 100 to the payee 2. The accounting system 3, when accounting a transaction ordered, checks whether the payee 2 holds his own payment account 4 within the accounting system 3. If the accounting system is able to identify the payment account 4 assigned to the MSISDN phone number specified as the payee's ID C, then the specified amount B will be transferred to the payment sub-account 4' within the payment account 4; otherwise, the amount B will be transferred to the account of the payee 2 held at his respective telecommunication operator, on account of charges due for services provided by this operator for the benefit of the payer 1.

EXAMPLE 8

The payee 2 sells a product by means of a TV commercial. The advertised product has the payee's ID C with the value 432432 assigned. The transaction code A is 145. When watching the product commercial, the payer 1 chooses to purchase it and dials from his mobile phone a sequence S USSD of *145*432432# or calls the number *145*432432. The data entered, together with the payer's ID D, being the MSISDN number, reach the accounting system 3, which requests P the payee 2 to specify the transaction amount B', constituting the value of the transaction. Subsequently, the transaction is accounted according to the standard procedure, whereas acknowledgment of the payment H sent to the payee 2 includes additional information on the payer 1, among others the delivery address and data needed for the invoice. If the payer 1 holds a business account within the payment account 4 as well, then by dialing the transaction code A as 146 in the transaction sequence, he declares its accounting from the business account, and the invoice data apply to his company.

EXAMPLE 9

The payer 1 calls the information number of an airline company with the aim to book a private plane ticket. He settles all flight parameters (date, time, and price), and declares intention to buy a ticket, paying for it via phone from his private account. The service operator, as the payee 2, sends to the accounting system 3 a request R for a temporary ID C", which will be assigned to this transaction. The value of the assigned temporary ID C" is 654654, the transaction amount B equals PLN 100, and the transaction code A is 145. The connection from the payer 1 is redirected by the service operator to the number *145*654654*100, being the sequence S, with which the accounting system 3 effects accounting of the transaction in a voice channel.

Applications in Industry

Implementation of the invention allows for effecting a universal accounting system, which makes it possible to account any type of electronic transactions in a simple way. The assumption that the payment's initiation is always initiated by the user ensures a high level of safety and control over expenditures. The invention also allows for effecting practically all types of payments with the same pattern, which greatly simplifies the system handling and adapting for any type of payments, e.g. Internet payments, TV shopping, payments for invoices, payments in stores, parking charges. The invention allows for accounting of the same transaction from several payment accounts at the same time, or for choosing a specific account or a group of accounts, from which the transaction will be accounted, e.g. accounting of transactions from the private or from the business account. The invention also allows for effecting periodical payments, where the article or the service is not delivered once, but within a certain time period, during which charges are calculated.

Identification of a number of payment accounts with one universal ID provides a significant increase of comfort with electronic payments, as the payer does not need to use e.g. IDs dedicated for the given account (e.g. payment cards). The invention is especially suitable for effecting the accounting system with the use of mobile phones, which makes it possible to use them in totally new applications. Implementation of a universal system for electronic payments has a favorable influence on the payment market, which is dominated by the outdated payment card technology. It also spurs emergence of new services and activity areas, in which the basic problem up to now has been collection of payments (e.g. coin machines without telecommunication interfaces). The invention has also a direct influence on the development of the banking sector, providing it with entirely new tools and possibilities.

Application of mobile phones for effecting electronic transactions, which in particular concerns the USSD and voice channels with tone dialing DTMF, makes it significantly easier to introduce electronic transactions to the market and enhances the possibilities of the whole system. Application of several complementary telecommunication channels (voice and text channels) improves the quality of the service, increases its reliability, and provides users with a possibility to match the method of effecting a transaction with their own liking. A method of effecting transactions in two independent channels which does not depend on the type of transaction, is simple, intuitive and uniform, makes it simple for such a solution to approach users—especially users in lesser command of new technologies.

What is claimed is:

1. A method of accounting an electronic transaction, wherein the transaction is initiated by a payer from an electronic terminal, the method comprising:

delivering to an accounting system: a transaction code describing a type of transaction, an amount describing a value of the transaction, a payer's ID assigned to a payer, and a payee's ID assigned to a payee, wherein the transaction code, the amount, the payer's ID, and the payee's ID are delivered to between the electronic terminal and the accounting system;

verifying, via the accounting system, whether the payer is an authorized user, whether a beneficiary with the payee's ID exists and what types of transactions are handled by the beneficiary, and whether the amount is available in a payment account of the payer;

sending from the accounting system cumulative information regarding the transaction to the payer, wherein the cumulative information preferably contains extended information on the transaction;

requesting the payer to accept the transaction, by sending an acceptance for the transaction;

effecting accounting of the transaction on the payment account via the accounting system;

sending acknowledgment of payment to the payee, including additional information on the payer, which is not directly related to transaction accounting; and sending well as acknowledgment of the transaction to the payer, including additional information delivered to the accounting system by the payee.

2. The method according to claim 1, wherein a number of different payment sub-accounts are assigned to the payment account wherein each of the payment sub-accounts are connected directly to institutions managing funds of the payer, wherin a single transaction of which, initiated by the payer, is accounted jointly from several of the payment sub-accounts, wherein the payer, when initiating a transaction, effects a pre-selection of a single sub-account or of a defined group of payment sub-accounts, from which the transaction is to be accounted, by choosing the corresponding transaction code or the payee's ID, assigned to the transaction, and the same payment sub-account is preferably used by a number of different payers within their payment sub-accounts for accounting of transactions initiated by them.

3. The method according to claim 1 or 2, wherein the payee's ID is a static ID, a temporary ID or a local ID, whereas the static ID is permanently assigned to the payee within the accounting system, the temporary ID is given on a temporary basis upon request of the payee, for a specified time period or for the needs of a single transaction, and the local ID is provided to a payee by the payer in order to account transactions for the payee who is not defined in the accounting system and the payee cannot be accessed by other payers.

4. The method according to claim 1 or 2, wherein the payee's ID is assigned to a specific transaction or to a specific offer of the payee, through which the offer is explicitly identified.

5. The method according to claim 1 or 2, wherein the transaction lasts for the given period of time, and the amount is calculated by the accounting system during the transaction initiated by the payer, the method further comprising:

automatically, for every accounting unit, delivered or defined by the payee, and upon initiation of the transaction by the payer calculating a beginning of unit-charges, which constitute components of the amount, whereas conclusion and complete accounting of the transaction is effected upon a request from the accounting system, the payee or the payer, and upon conclusion of the transaction acknowledgment of the payment is sent again to the payee, and the payer receives acknowledgment of the transaction, which include cumulative information concerning the whole transaction and its conclusion, while unit-charges are accounted by the accounting system on-line or off-line.

6. The method according to claim 5, wherein the amount is delivered to the accounting system in the beginning of a periodic transaction, while such a transaction is calculated up to the value of the amount, after which it is terminated by the accounting system.

7. The method according to claim 1 or 2, wherein a transaction amount is received from the payee upon a request from the accounting system, which makes it possible to verify whether the amount is correct on the basis of the transaction amount, or to exclude the necessity to quote the amount when initiating a transaction by the payer, whereas concurrently with the transaction amount, the payee sends additional information on the transaction to the accounting system.

* * * * *